Sept. 22, 1925.

C. M. BURDETTE

DEHYDRATING APPARATUS

Filed Aug. 1, 1919

1,554,330

Inventor:
Cronin M. Burdette,
By Chas. N. Butler
Attorney.

Patented Sept. 22, 1925.

1,554,330

UNITED STATES PATENT OFFICE.

CRONIN M. BURDETTE, OF WEST CHESTER, PENNSYLVANIA, ASSIGNOR TO THE SHARPLES SEPARATOR COMPANY, OF WEST CHESTER, PENNSYLVANIA, A CORPORATION OF PENNSYLVANIA.

DEHYDRATING APPARATUS.

Application filed August 1, 1919. Serial No. 314,797.

*To all whom it may concern:*

Be it known that I, CRONIN M. BURDETTE, a citizen of the United States, residing at West Chester, in the county of Chester and State of Pennsylvania, have invented an Improved Dehydrating Apparatus, of which the following is a specification.

This invention relates primarily to the dehydration of milk and other liquids, for the purpose of reducing them to a dry powder, in an efficient, rapid, simple and inexpensvie manner.

The dehydration of milk as commonly practiced has entailed the use of apparatus having small nozzles through which the liquid is pumped at high pressure to produce a spray in a hot and dry atmosphere. This apparatus is objectionable because, amongst other reasons, it is expensive to maintain, it clogs very readily and it wears very rapidly.

In accordance with my invention in its preferred form, the liquid as milk, which is to be dehydrated, is fed through a special centrifugal machine having a hollow journal extending through the top or ceiling of a compartment or room provided with a hot and dry atmosphere, in the top of which compartment the milk is centrifuged and sprayed or vaporized by the machine, driven and fed from the exterior of the compartment, but it may be fed or wholly located within the room.

The characteristic features of the invention are fully disclosed in the following description and the accompanying drawings in illustration thereof.

Figure 1:
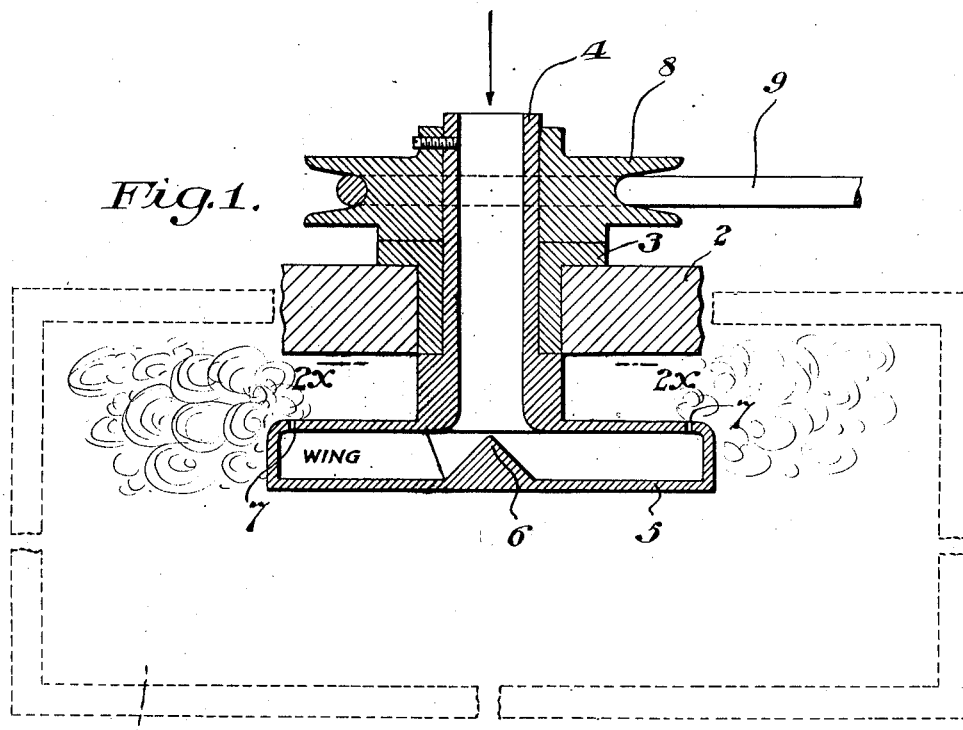
Figure 2:
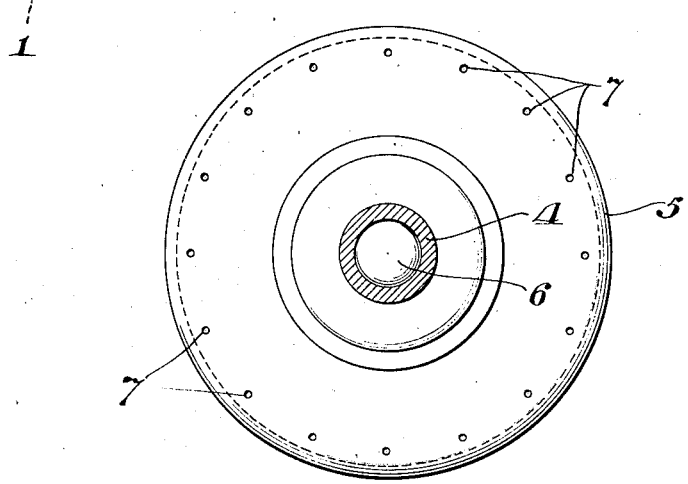

In the drawings, Fig. 1 is a part diagrammatic vertical section of apparatus adapted for use in practicing the invention, and Fig. 2 is a sectional view taken on the line 2×—2× of Fig. 1.

The apparatus illustrated in the drawing comprises the chamber 1 having a top or ceiling 2 provided with a bearing 3. In this bearing is journalled a vertical tubular shaft 4 having at the bottom thereof the hollow centrifugal wheel or flat bowl 5 which contains the axially disposed cone 6 in the bottom thereof and the apertures 7 in its top at or near its periphery.

A pulley 8 is fixed to the hollow journal 4 upon the bearing 3 and is driven by a belt 9 and this drives the bowl 5 at the desired speed. Said bowl 5 is hollow, as above noted, and is in the form of an enclosed cylinder with an inlet opening at the axis thereof.

In the operation of the device, the bowl is first revolved up to the proper speed at which the atomizing or vaporizing of the substance to be dehydrated takes place after which the substance is fed in a stream of suitable volume, preferably by means of a smaller pipe depending part way into the journal which serves as the inlet opening for the bowl 5. As the milk or substance passes down the journal it engages the spreader 6 by which it is directed outwardly and evenly distributed over the bottom surface of the bowl where it is carried by centrifugal force outwardly and then upwardly along the vertical wall whence it is discharged through the openings 7. Due to the presence of air within the bowl, the same naturally being drawn in through the hollow journal 4, this air will be forced outwardly with the centrifuged milk through the holes 7 to thereby bring about the complete atomization of the milk. This outgoing air draws in more air through the journal 4 to replace it.

Furthermore, it will be evident that the above device is adapted to effectively clarify the milk because the filth which is lighter than the milk will tend to remain adjacent the base of the spreader 6, while that filth which is heavier than the milk will be confined by the centrifugal force to the vertical wall of the bowl and will not be discharged through the openings 7. As the liquid is discharged in the form of a fine spray, or mist into the heated chamber 1, the dry atmosphere of the chamber will absorb the moisture in the atomized liquid and the dehydrated matter will fall to the bottom of the chamber where it may be collected.

Having described my invention, I claim:

1. An apparatus for dehydrating liquids comprising a chamber adapted to be heated, a centrifugal atomizer disposed within said chamber and including a substantially closed bowl rotating about a vertical axis and having an inlet opening adjacent its axis for the influx of liquid, and relative small discharge openings in the upper wall of said bowl adjacent to but spaced from the outer vertical wall of said bowl, the discharge openings being so proportioned as to cause the liquid to be discharged into the heating chamber in the form of fine mist or spray.

2. An apparatus for dehydrating liquids comprising a chamber adapted to be heated, a centrifugal atomizer disposed within said chamber and including a substantially closed bowl rotating about a vertical axis and provided with an inlet for a liquid to be dehydrated, said bowl having its upper and lower walls relatively close together, the upper wall of said bowl being provided with a plurality of relatively small openings located adjacent to but spaced from the vertical wall of the bowl and so proportioned as to cause the liquid to issue from said openings in a fine mist or spray.

Signed at West Chester, in the county of Chester and State of Pennsylvania, this 30th day of July 1919.

CRONIN M. BURDETTE.